US009530154B2

(12) United States Patent
Free

(10) Patent No.: US 9,530,154 B2
(45) Date of Patent: Dec. 27, 2016

(54) ADVERTISING RECEPTACLE

(76) Inventor: Anthony C. Free, Philadelphia, PA (US)

(*) Notice: Subject to any disclaimer, the term of this patent is extended or adjusted under 35 U.S.C. 154(b) by 1774 days.

(21) Appl. No.: 11/752,671

(22) Filed: May 23, 2007

(65) Prior Publication Data

US 2008/0289235 A1    Nov. 27, 2008

(51) Int. Cl.
*G06Q 30/02* (2012.01)
*G09F 27/00* (2006.01)
*B65F 1/14* (2006.01)

(52) U.S. Cl.
CPC ......... *G06Q 30/0273* (2013.01); *B65F 1/1426* (2013.01); *B65F 2210/128* (2013.01); *B65F 2210/16* (2013.01); *B65F 2210/168* (2013.01); *G06Q 30/0241* (2013.01); *G09F 27/005* (2013.01)

(58) Field of Classification Search
USPC .................................. 705/14; 455/406, 408
See application file for complete search history.

(56) References Cited

U.S. PATENT DOCUMENTS

| 4,257,511 | A | * | 3/1981 | Miller | ................... | G07F 7/0609 |
| | | | | | | 100/210 |
| 5,701,694 | A | * | 12/1997 | Atkinson | ................ | G09F 23/06 |
| | | | | | | 40/124.2 |
| 2002/0055880 | A1 | * | 5/2002 | Unold et al. | ..................... | 705/26 |
| 2002/0178445 | A1 | * | 11/2002 | Eldering et al. | ................ | 725/32 |
| 2003/0084126 | A1 | * | 5/2003 | Kumar et al. | ................ | 709/219 |
| 2005/0108095 | A1 | * | 5/2005 | Perlmutter | ...................... | 705/14 |
| 2006/0070281 | A1 | * | 4/2006 | Passannante | ................... | 40/567 |
| 2006/0080173 | A1 | * | 4/2006 | Robinson et al. | ............. | 705/14 |
| 2006/0255033 | A1 | * | 11/2006 | Yang et al. | .................... | 220/211 |
| 2007/0192189 | A1 | * | 8/2007 | Popowich et al. | ............. | 705/14 |
| 2007/0282898 | A1 | * | 12/2007 | Stark et al. | ............... | 707/103 R |
| 2008/0275757 | A1 | * | 11/2008 | Sharma et al. | ................ | 705/10 |

FOREIGN PATENT DOCUMENTS

GB          2261096 A  *  5/1993

OTHER PUBLICATIONS

A Trashcan That Senses Your Desire to Deposit Garbage by Steve West Feb. 26, 2007 20:59:43, downloaded from http://www.cinemablend.com/technology/A-Trashcan-That-Senses-Your-Desire-To-Deposit-Garbage-3019.html.*

* cited by examiner

*Primary Examiner* — Sun Li
*Assistant Examiner* — Bion A Shelden
(74) *Attorney, Agent, or Firm* — Glenn Snyder

(57) ABSTRACT

A receptacle may include a container to receive trash and other items. The receptacle may also include a display area to provide advertisements to people located in the vicinity of the receptacle.

4 Claims, 7 Drawing Sheets

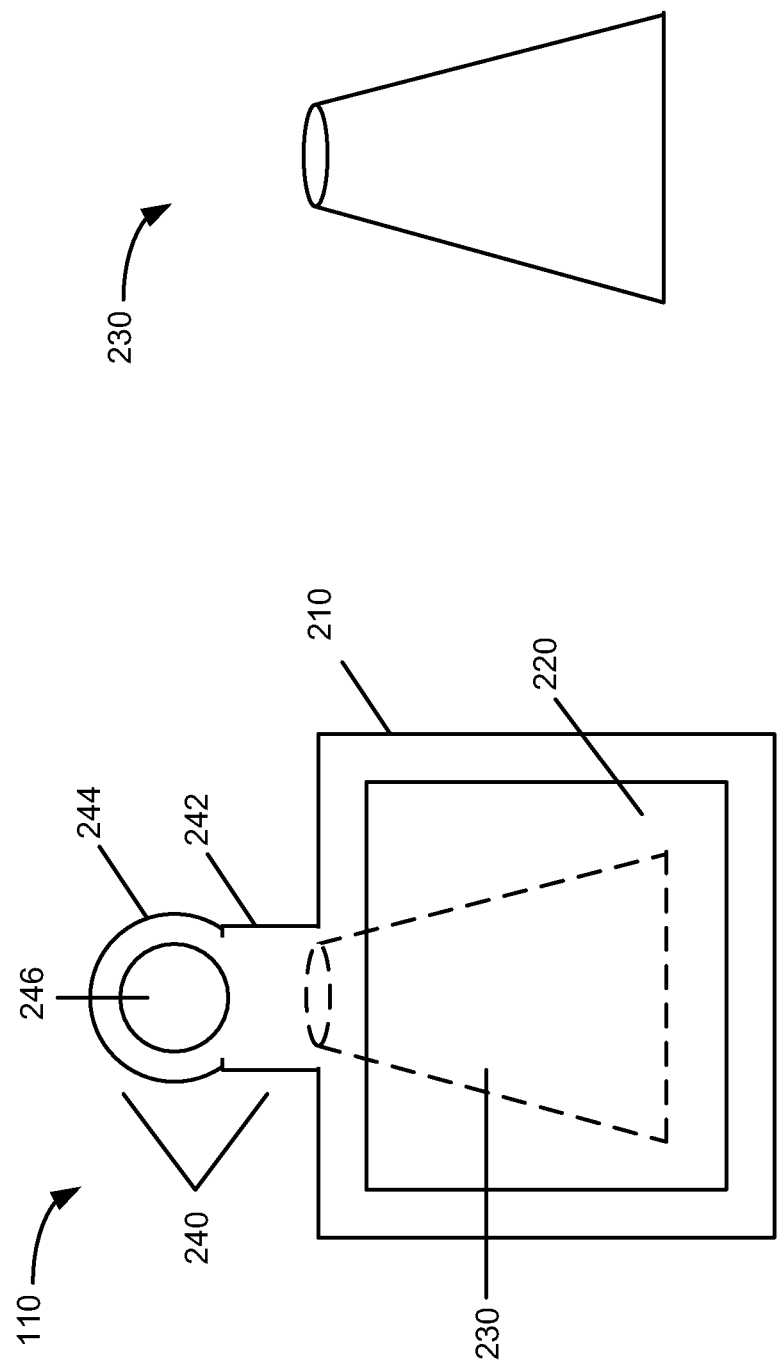

ADVERTISING RECEPTACLE

TECHNICAL FIELD OF THE INVENTION

The invention relates generally to advertising and, more particularly, to advertising using receptacles.

DESCRIPTION OF RELATED ART

Advertising has become an increasingly important mechanism for businesses to reach potential customers. For example, print advertising and online advertising have become common ways for businesses to reach potential customers.

BRIEF DESCRIPTION OF THE DRAWINGS

Reference is made to the attached drawings, wherein elements having the same reference number designation may represent like elements throughout.

FIGS. 2A and 2B are diagrams illustrating components of the receptacle of FIG. 1 according to an exemplary implementation;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Implementations described herein provide dual purpose receptacles. The receptacles may be used as containers for trash, cigarette butts and other items. The receptacles may also be used to display advertisements. In one implementation, the receptacles may be placed outside establishments where people typically congregate to smoke. In an exemplary implementation, revenue associated with the advertising provided via a receptacle may be shared by the owner of the receptacle and the owner of the establishment where the receptacle is located.

Exemplary System

Figure 1:
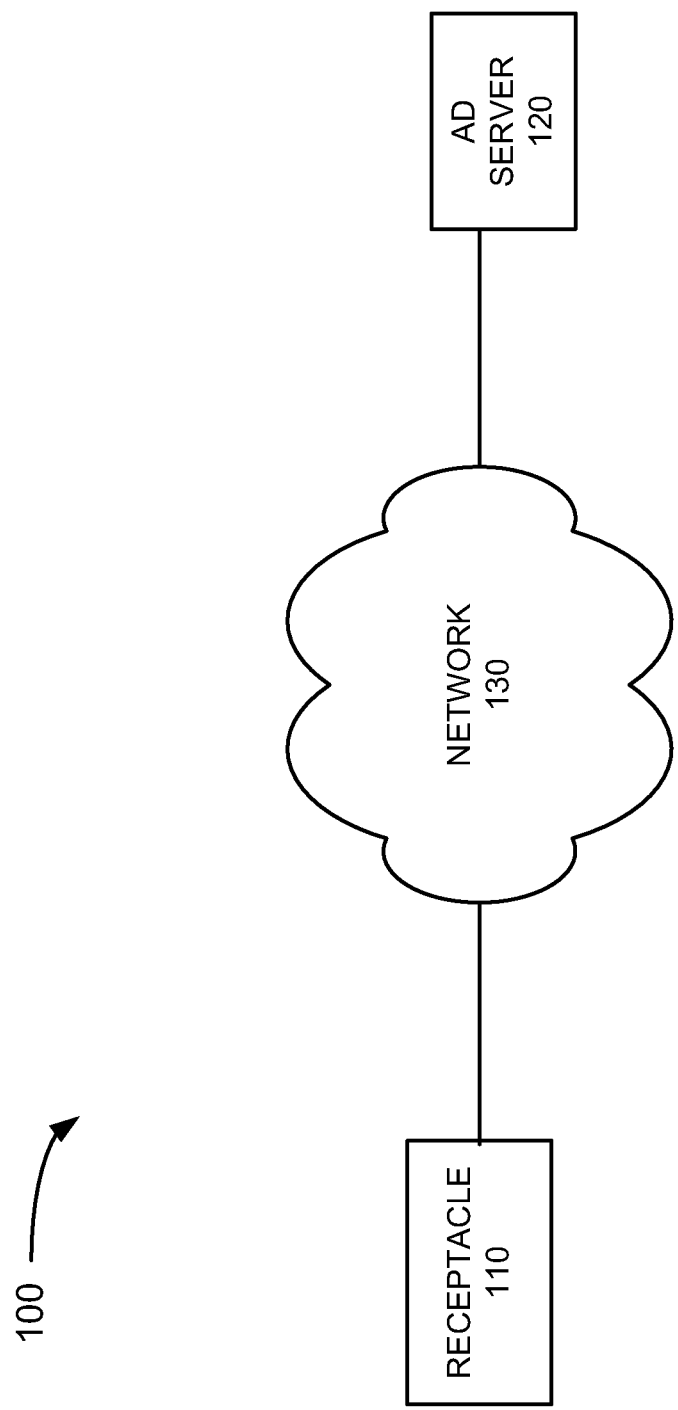
FIG. 1 is a diagram of an exemplary system in which methods and systems described herein may be implemented.

FIG. 1 is a diagram of an exemplary system 100 in which methods and systems described herein may be implemented. System 100 may include receptacle 110, ad server 120 and network 130. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Receptacle 110 may include any type of device that is used to dispose of various items (e.g., trash, cigarette butts, cigar butts, etc.) and also is able to display advertisements. In an exemplary implementation, receptacle 110 may be a device capable of transmitting and receiving data (e.g., voice, text, images, multi-media data) to/from network 130. For example, receptacle 110 may receive and display advertisements (also referred to herein as "ads") received from ad server 120 via network 130. In an exemplary implementation, receptacle 110 may communicate with ad server 120 over network 130 via wired, wireless or optical connections.

Ad server 120 may include one or more servers and/or computing devices that provide advertisements to various entities in system 100. For example, ad server 120 may provide advertisements to receptacle 110 via network 130.

Network 130 may include one or more networks, such as a cellular network, a satellite network, the Internet, a telephone network, such as the Public Switched Telephone Network (PSTN), a metropolitan area network (MAN), a wide area network (WAN), a local area network (LAN), or another type of network. In an exemplary implementation, network 130 includes a cellular network that uses components for transmitting data to and from receptacles 110 via wireless links. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

FIGS. 2A and 2B are diagrams illustrating components of receptacle 110 of FIG. 1 according to an exemplary implementation. Aspects of the invention are described herein in the context of a receptacle that provides advertisements and also acts as a receptacle to dispose of, for example, trash, cigarette butts, etc. It should also be understood that systems and methods described herein may also be implemented in other devices that allow users to dispose of trash, cigarette butts, etc., with or without including various other communication functionality. For example, receptacle 110 may be a receptacle for trash that does not include various communication functionality for communicating with other devices, such as ad server 120.

Referring to FIG. 2, receptacle 110 may include base 210, display 220, internal container 230 and top 240. Other components, such as a hanger portion (not shown) may be used to affix receptacle 110 to a building, post, etc. In other implementations, receptacle 110 may be freestanding.

Base 210 may protect the components of receptacle 110 from outside elements. Base 210 may include a lower portion that houses display 220. Top 240 may include neck 242, upper portion 244 and opening 246. Neck 242 may fit over base 210 and be connected to internal container 230. Neck 242 may also be connected to upper portion 244, which may be round or oval shaped, as illustrated in FIG. 2A. Upper portion 244 may include an opening 246 used to deposit trash item in receptacle 110 such that materials deposited in opening 246 fall into container 230. That is, opening 246 may be an opening for users to deposit cigarette butts, trash, etc., into internal container 230.

Display 220 may be a liquid crystal display (LCD), a light emitting diode (LED) based display or another type of display that may provide visual information. For example, display 220 may visually display advertisements provided from ad server 120. Display 220 may also display other information, such as the current time, downloaded content (e.g., news or other information), etc. In alternative implementations, display 220 may be an area on receptacle 110 where conventional print advertising (e.g., advertising on paper, cardboard, plastic, etc.) may be mounted and displayed.

Display 220 may be protected from exterior elements by hard plastic or a glass covering. It should also be noted that in some instances, receptacle 110 may include a display, such as display 220 on two or more sides of receptacle 110. Each display may display the same information.

Internal container 230, shown via dotted lines in FIG. 2A may be a container that is located within housing 210. The top portion of internal container 230 may be coupled to or located adjacent to neck 242 and/or opening 246 to receive cigarette butts, cigar butts, trash, etc. FIG. 2B illustrates internal container 230 in more detail. As illustrated in FIG. 2B, internal container 230 may be cone-shaped. Internal container 230 may be formed of metal, ceramic, another material or a combination of materials. In other implementations, internal container 230 may have other shapes. In addition, in other implementations, other types of internal container devices may be used.

Figure 2D:
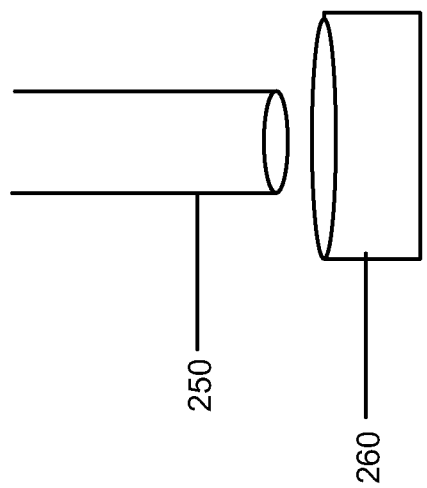
FIGS. 2C and 2D are diagrams illustrating components of the receptacle of FIG. 1 according to another exemplary implementation.
Figure 2C:
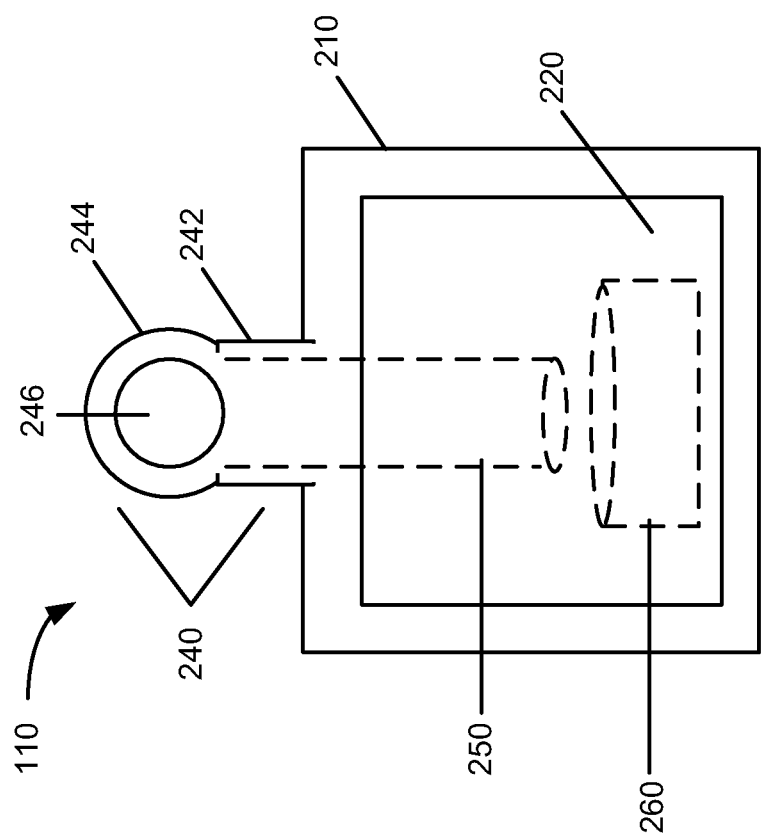

For example, FIGS. 2C and 2D are diagrams illustrating components of the receptacle of FIG. 1 according to another exemplary implementation. Referring to FIG. 2C, receptacle may include base 210, display 220 and top 240. These components may be similar to the components described in FIG. 2A. Receptacle 110 may also include chute 250 and pan 260, illustrated by the dotted lines in FIG. 2C. In one implementation, chute 250 may be part of top 240. As illustrated in FIG. 2C, chute 250 connects to neck 242 and opening 246 in upper portion 244 to receive trash, cigarette butts, etc. An opening at the bottom of chute 250 may be connected to or located adjacent pan 260, as illustrated in FIG. 2D. Trash deposited in opening 246 may travel down chute 250 and end up in pan 260. Chute 250 and pan 260 may be formed of metal, ceramic, another material or a combination of materials.

Receptacle 110 may include other components (not shown). For example, receptacle 110 may include one or more control buttons that permit an operator/user to interact with receptacle 110 to cause receptacle 110 to perform one or more operations, such as display an advertisement, provide tracking information associated with advertisements provided via display 220, etc. One or more control buttons may also controls various settings associated with display 220, such as a brightness setting. In addition, a speaker (not shown) may be included in receptacle 110. For example, a speaker may be used to audibly output advertisements or other information to people in the vicinity of receptacle 110.

Figure 3:
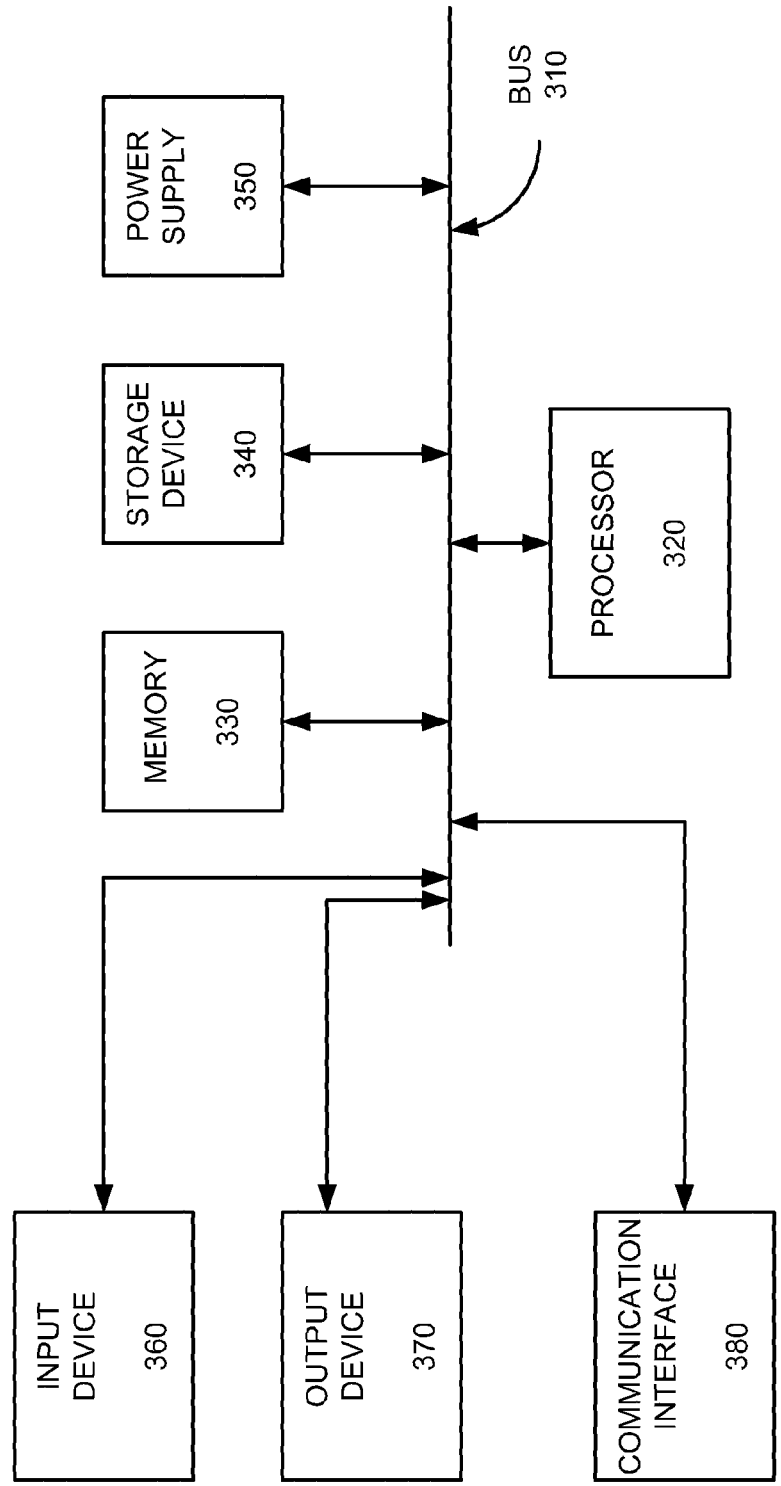
FIG. 3 is a functional diagram of the receptacle of FIG. 1 according to an exemplary implementation.

FIG. 3 is a diagram illustrating functional components of receptacle 110 according to an exemplary implementation. Receptacle 110 may include bus 310, processor 320, memory 330, storage device 340, power supply 350, input device 360, output device 370 and communication interface 380. Bus 310 permits communication among the components of receptacle 110. One skilled in the art would recognize that receptacle 110 may be configured in a number of other ways and may include other or different elements. For example, receptacle 110 may include one or more modulators, demodulators, encoders, decoders, etc., for processing data.

Processor 320 may include a processor, microprocessor, an application specific integrated circuit (ASIC), field programmable gate array (FPGA) or the like. Processor 320 may execute software instructions/programs or data structures to control operation of receptacle 110.

Memory 330 may include a random access memory (RAM) or another type of dynamic storage device that stores information and instructions for execution by processor 320; a read only memory (ROM) or another type of static storage device that stores static information and instructions for use by processor 320; a flash memory (e.g., an electrically erasable programmable read only memory (EEPROM)) device for storing information and instructions. Memory 330 may also be used to store temporary variables or other intermediate information during execution of instructions by processor 320. Instructions used by processor 320 may also, or alternatively, be stored in another type of computer-readable medium accessible by processor 320. A computer-readable medium may include one or more memory devices and/or carrier waves.

Storage device 340 may include some type of magnetic or optical recording medium and its corresponding drive. In an exemplary implementation, storage device 340 may be used to store advertisements.

Power supply 350 may include one or more batteries or other power source components used to supply power to components of receptacle 110. In some implementations, receptacle 110 may plug into a conventional power outlet to power receptacle 110.

Input device 360 may include mechanisms that permit an operator to input information to receptacle 110, such as a microphone, control buttons, a keyboard, a mouse, a pen, voice recognition and/or biometric mechanisms, etc. Input device 360 may also include a universal serial bus (USB) port, a disk drive (e.g., a compact disk (CD) drive) for receiving input, such as input from another computer device or input via a memory stick or CD.

Output device 370 may include one or more mechanisms that output information to the user, including a display, such as display 220, a printer, one or more speakers, etc.

Communication interface 380 may include any transceiver-like mechanism that enables receptacle 110 to communicate with other devices and/or systems. For example, communication interface 380 may include a modem or an Ethernet interface to a LAN. Communication interface 380 may also include mechanisms for communicating via a network, such as a wireless network. For example, communication interface 380 may include one or more radio frequency (RF) transmitters, receivers and/or transceivers and one or more antennas for transmitting and receiving RF data via network 130.

Receptacle 110 may provide a platform for displaying advertisements. Receptacle 110 may perform these operations in response to processor 320 executing sequences of instructions contained in a computer-readable medium, such as memory 330. Such instructions may be read into memory 330 from another computer-readable medium via, for example, communication interface 380. A computer-readable medium may include one or more memory devices and/or carrier waves. In alternative embodiments, hardwired circuitry may be used in place of or in combination with software instructions to implement processes consistent with the invention. Thus, implementations described herein are not limited to any specific combination of hardware circuitry and software.

Exemplary Processing

Figure 4:
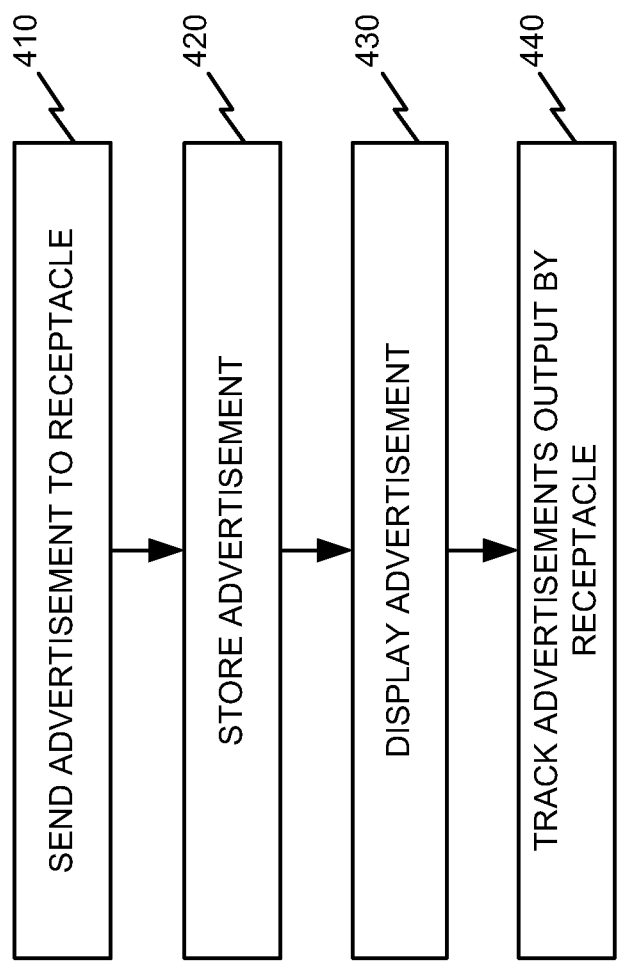
FIG. 4 is a flow diagram illustrating exemplary processing by components in the system of FIG. 1.

FIG. 4 is a flow diagram illustrating exemplary processing by elements in system 100, such as receptacle 110 and ad server 120 for providing advertisements via display 220. Processing may begin with ad server 120 sending an advertisement to receptacle 110 (act 410). Receptacle 110 may receive the advertisement and optionally store the advertisement in memory, such as storage device 340 (act 420). Receptacle 110 may then output the advertisement via display 220 (act 430).

Figure 5B:
FIGS. 5A and 5B are diagrams illustrating exemplary displays provided by the receptacle of FIG. 1.
Figure 5A:

As an example, assume that receptacle 110 is located outside a restaurant or a bar where smoking is prohibited. In this case, patrons may gather outside the restaurant/bar to smoke. Ad server 120 may provide ads that are relevant to the location where receptacle 110 is being used. For example, ad server 120 may provide an advertisement to receptacle 110 for an establishment, such as a jewelry store, located on the same block as the restaurant/bar where receptacle 110 is located. Receptacle 110 may receive the ad and display the ad via display 220, as illustrated in FIG. 5A.

Alternatively, ad server 120 may provide other ads to receptacle 110 that may be relevant to patrons located outside the restaurant/bar where receptacle 110 is located. For example, ad server 120 may provide an ad for a cab company. Receptacle 110 may receive the ad and display the ad via display 220, as illustrated in FIG. 5B.

In other instances, ad server 120 may provide ads to receptacle 110 based on the time of day. For example, ad server 120 may provide ads, such as the one illustrated in FIG. 5B late at night, as opposed to early in the morning. Ad server 120 may also provide ads based on the location where receptacle 110 is located. For example, ad server 120 may provide ads for alcoholic beverages if receptacle 110 is located outside a bar or restaurant. If receptacle 110 is located outside an office where workers may congregate on breaks, ad server 120 may provide ads associated with lunch spots in the vicinity/neighborhood.

In the implementations described above, ad server 120 has been described as providing ads to receptacle 110. In other instances, ads may be pre-stored on receptacle 110, such as in storage device 340. New ads may be provided via insertion of, for example, a memory stick, a CD, etc., to receptacle 110, may be downloaded from a computer or memory device via a USB port located on receptacle 110 or may be provided via another conventional mechanism. In this case, processor 320 may output various ads to display 220 based on time of day, location of receptacle and/or any other combination of factors.

In still other implementations, advertisements provided via receptacle 110 may be print advertisements. For example, ads provided via paper, cardboard, plastic, etc., may be mounted on or provided via display area 220 of receptacle 110.

In each case, ads provided or output via display 220 may be relevant and useful to patrons using receptacle 110 to discard cigarette butts, trash, etc., or patrons who are just congregating near receptacle 110. In some instances, receptacle 110 may output audible advertisements via a speaker included in receptacle 110. In each case, people located near receptacle 110 may use receptacle 110 to discard trash, such as by placing items in opening 246 (FIGS. 2A and 2C), and to also view and/or listen to advertisements output, for example, via display 220.

Receptacle 110 may also track ads output via receptacle 110 (act 440). For example, receptacle 110 may track the number of times an ad was displayed over a period of time, the total amount of time an ad was displayed over the period of time, etc. This information may be used for billing related purposes, as described in more detail below.

Figure 6:
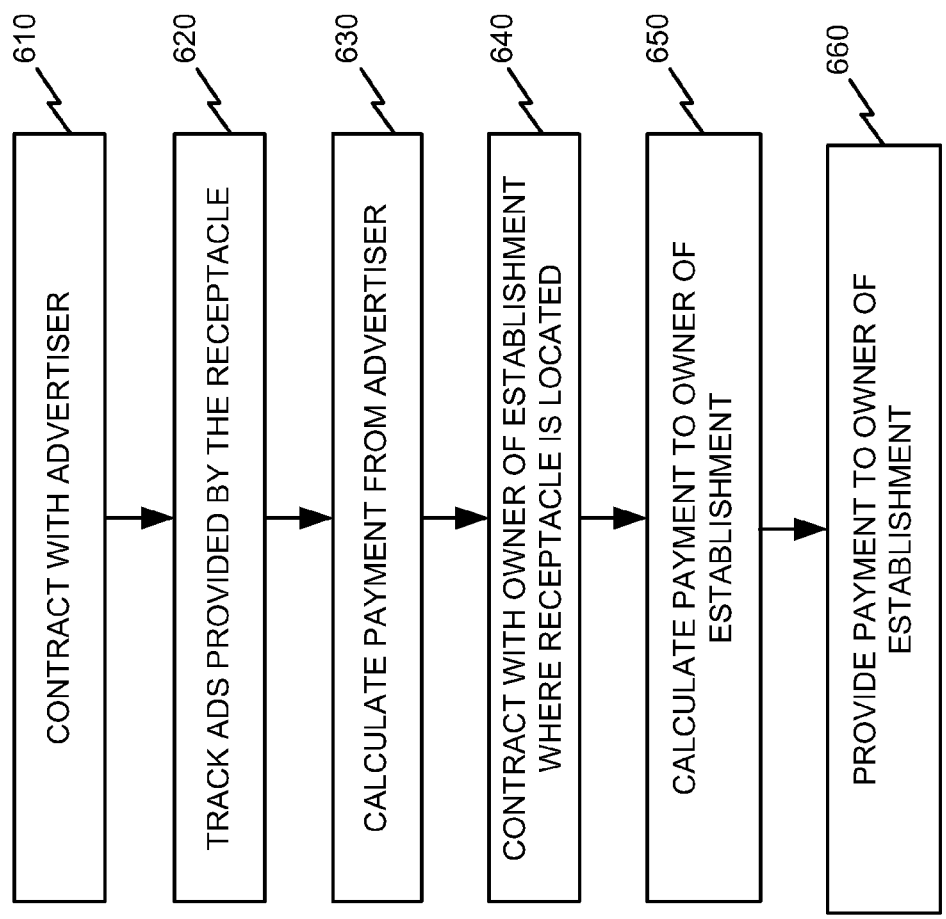
FIG. 6 is a flow diagram illustrating processing associated with revenue sharing consistent with an exemplary implementation.

FIG. 6 is a flow diagram illustrating exemplary processing associated with sharing advertising related revenue consistent with an exemplary implementation. Processing may begin with the owner of receptacle 110 contracting with an advertiser to display ads (act 610). The contract between the advertiser and the owner of receptacle 110 may define how much the advertiser will pay the owner of receptacle 110 for displaying the ad. The payment may be based on, for example, how many times the ad is displayed over the course of a period of time (e.g., a day, week, month, etc.). The payment may also be based on the time of the day that the ad is displayed. For example, an ad displayed in the evening hours outside a non-smoking restaurant or bar where more smokers are likely to congregate may be valued more highly than an ad provided outside the restaurant/bar in the morning.

The payment may further be based on the location of receptacle 110. For example, a receptacle 110 located on a busy street with a lot of foot traffic or outside a popular restaurant/bar may be more highly valued that a receptacle 110 located in a more remote location.

In some implementations, receptacle 110 may be configured to count the number of patrons located in the vicinity of receptacle 110. For example, an electronic sensor located in receptacle 110 may be able to provide an estimate of people passing by receptacle 110 in a period of time, such as a period of time in which a particular advertisement is displayed. Such a sensor may be similar to an occupancy sensor in a room that detects movement or may be a more sophisticated sensor that is able to distinguish people from other moving objects, such as vehicles passing by. In other implementations, the sensor may sense when a person deposits trash in receptacle 110. In this manner, receptacle 110 may track foot traffic over a period of time (e.g., an hour) in front of receptacle 110 and/or number of persons using receptacle 110 over a period of time. This information may be used to provide an estimate of how many people viewed an ad provided by receptacle 110.

As an example, assume that the owner of receptacle 110 has contracted with a local jewelry store (e.g., HPC Jewelry Designs) to display ads for the jewelry store. Further assume that receptacle 110 tracks information associated with the display of the ad (act 620). For example, processor 320 (FIG. 3) may track for each ad how many times the ad was displayed during a period of time, such as a single day, week, month, etc. Processor 320 may also track the duration of time that the ad was displayed for each occurrence of the ad, times of day the ad was displayed, such as the particular time (e.g., 11:00 PM) or a period of time (late evening). Processor 320 may also track the total cumulative amount of time that the particular ad was displayed over the period of time. Processor 320 may further determine an estimate of foot traffic associated with the location of receptacle 110 and/or the number of persons using receptacle 110 over the periods of time when the ad was displayed. The amount of foot traffic and/or the number of users of receptacle 110 may be used to determine the amount of money an advertiser will pay for each ad. For example, if foot traffic/use of receptacle 110 is heavy when an ad is displayed, the advertiser may pay more money for that ad than for an ad displayed when foot traffic/use of receptacle 110 is lower.

Receptacle 110 may then automatically calculate payment associated with the ad based on the previously agreed upon contract between the jewelry store and the owner of receptacle 110 (act 630). Receptacle 110 may also automatically generate a bill for the jewelry store. In some instances, receptacle 110 may send the bill electronically to a destination associated with the jewelry store. The bill may include detailed information regarding how many times the ad was displayed, when the ad was displayed, the total duration of time the ad was displayed, etc. In this manner, receptacle 110 may display ads, track adds and generate billing information.

In some cases, the owner of receptacle 110 may not be the owner of the establishment where receptacle 110 is located. In this case, the owner of receptacle 110 may also contract with the owner of the establishment where receptacle 110 is located to allow receptacle 110 to be placed in front of the establishment (act 640). For example, to entice owners of businesses to allow receptacles 110 to be provided outside their places of business, the owner of receptacle 110 and a business establishment may agree to share revenue from advertisers that display ads via receptacle 110. The owner of receptacle 110 and an establishment where a receptacle 110 is located may split the revenue equally or may split the revenue based on any other agreed upon percentage (e.g., 90/10, 70/30, 60/40, 30/70, etc.).

Receptacle 110 may then automatically calculate payment to be provided to the owner of the establishment where receptacle 110 is located (act 650). The owner of receptacle 110 may then provide payment to the owner of the establishment where receptacle 110 is located (act 660). In some instances, the advertiser (e.g., HPC Jewelry Designs, Tony's Cab Company, etc.) may directly pay the owner of the establishment and the owner of receptacle 110.

In some implementations, the owner of the establishment where receptacle 110 is located may receive all or a portion of his/her "payment" in the form of free advertising via receptacle 110. For example, the owner of the establishment may be given advertising time/space that may be provided via receptacle 110 at no cost or at a reduced cost. These advertisements may advertise particular sales/specials associated with the establishment where receptacle 110 is located and may change over time. In still other implementations, a portion of the "payment" to the owner of the establishment may be in the form of emptying receptacle 110 on a regular basis. For example, the owner of receptacle 110 may empty receptacle 110 on a regular basis, as opposed to the owner of the establishment where receptacle 110 is located being responsible for emptying receptacle 110.

In each case, payment (e.g., monetary or non-monetary) to the owner of the establishment where receptacle 110 is located provides additional enticement to the owner of the establishment to allow placement of receptacle 110. Therefore, receptacle 110 serves the purpose of keeping the area around receptacle 110 trash free by acting as a place to deposit cigarette butts, trash, etc., and also provides advertisements to a captive audience, such as smokers congregating outside a non-smoking establishment.

CONCLUSION

Implementations consistent with the aspects described herein provide a dual purpose device that is used for receiving trash, cigarette butts, etc., and also for providing advertisements. In addition, by providing revenue sharing arrangements, more widespread deployment of receptacles is possible.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein focus on receptacles that receive cigarette butts and other trash. In other implementations, more conventional trash containers, such as trash containers similar to those found on a typical city street, may be modified to include displays to provide advertisements.

In addition, in some instances, receptacles may provide other information to users. For example, the time, temperature and news information may be provided by display 220 and/or output via a speaker included on receptacle 110. In still other instances, receptacle 110 may dispense coupons associated with ads provided by receptacle 110. For example, receptacle 110 may dispense a discount coupon for a drink at the establishment, may provide a discount coupon for a cab company that advertises via receptacle 110, etc.

Further, while series of acts have been described with respect to FIGS. 4 and 6, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A trash receptacle, comprising:
    an external housing comprising a top portion, a base portion and an opening located at the top portion;
    an internal container located within the external housing to receive trash or cigarette butts deposited via the opening;
    a display area located on the external housing and configured to display advertisements;
    logic configured to:

track a plurality of advertisements provided by the trash receptacle, wherein when tracking the plurality of advertisements, the logic is configured to:
  determine how many times that each of the plurality of advertisements was displayed on the display area over a period of time, a duration of time that each of the plurality of advertisements was displayed on the display area each time each of the plurality of advertisements was displayed, times of day that each of the plurality of advertisements was displayed on the display area, and a total duration of time that each of the plurality of advertisements was displayed on the display area over the period of time, and
generate billing information associated with each of the plurality of advertisements, wherein when generating billing information, the logic is configured to:
generate billing information for a first one of the plurality of advertisements based on the total duration of time the first advertisement was displayed on the display area, wherein the billing information includes how many times the first advertisement was displayed over the period of time, the times of day that the first advertisement was displayed over the period of time and the total duration of time that the first advertisement was displayed over the period of time;
generate revenue sharing information associated with a business establishment where the trash receptacle is located, wherein when generating revenue sharing information, the logic is configured to:
  generate revenue sharing information based on how many times each advertisement was displayed, the duration of time in which each advertisement was displayed, and an estimated number of people passing by the trash receptacle when each advertisement was displayed;
provide at least some free advertisement to the business establishment where the trash receptacle is located via the display area;
a first sensor configured to estimate a first number of people passing by the trash receptacle over the period of time and distinguish between people passing by the trash receptacle and vehicles passing by the trash receptacle;
a second sensor configured to estimate a second number of people using the trash receptacle to deposit trash over the period of time;
wherein the logic is further configured to:
  receive, from the first sensor, the estimated first number of people,
  receive, from the second sensor, the estimated second number of people, and
  use the first number and the second number to generate the billing information; and
a coupon dispenser configured to dispense coupons associated with at least some of the advertisements.

2. The trash receptacle of claim 1, further comprising:
a memory configured to store a plurality of advertisements associated with a plurality of advertisers.

3. The trash receptacle of claim 2, further comprising:
a radio frequency (RF) receiver configured to receive advertisements via a network.

4. The trash receptacle of claim 1, further comprising:
a neck portion coupling the top portion to the internal container.

* * * * *